June 15, 1965 J. E. JENDRISAK 3,189,426
GLASS BENDING APPARATUS
Filed March 29, 1960 4 Sheets-Sheet 4

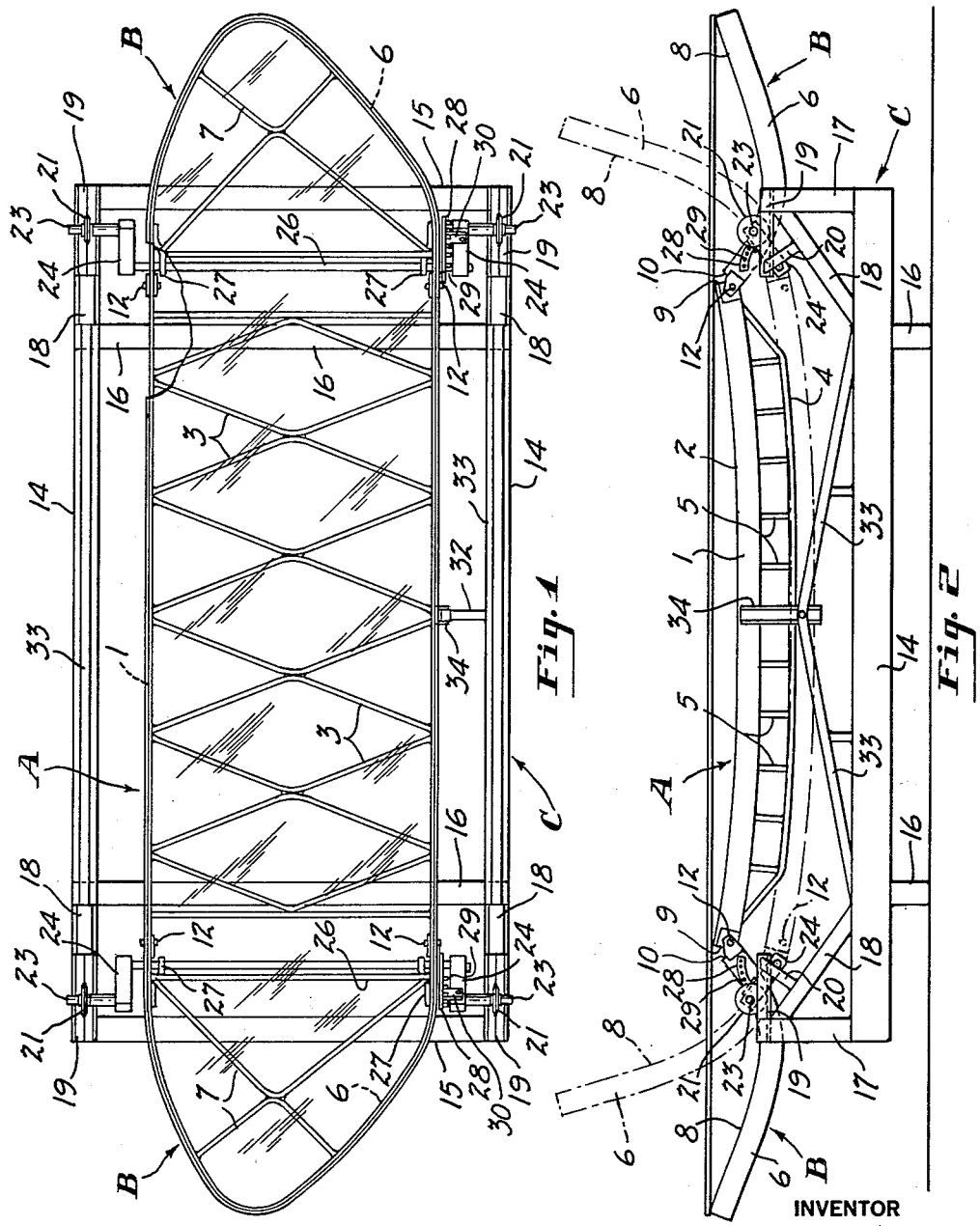

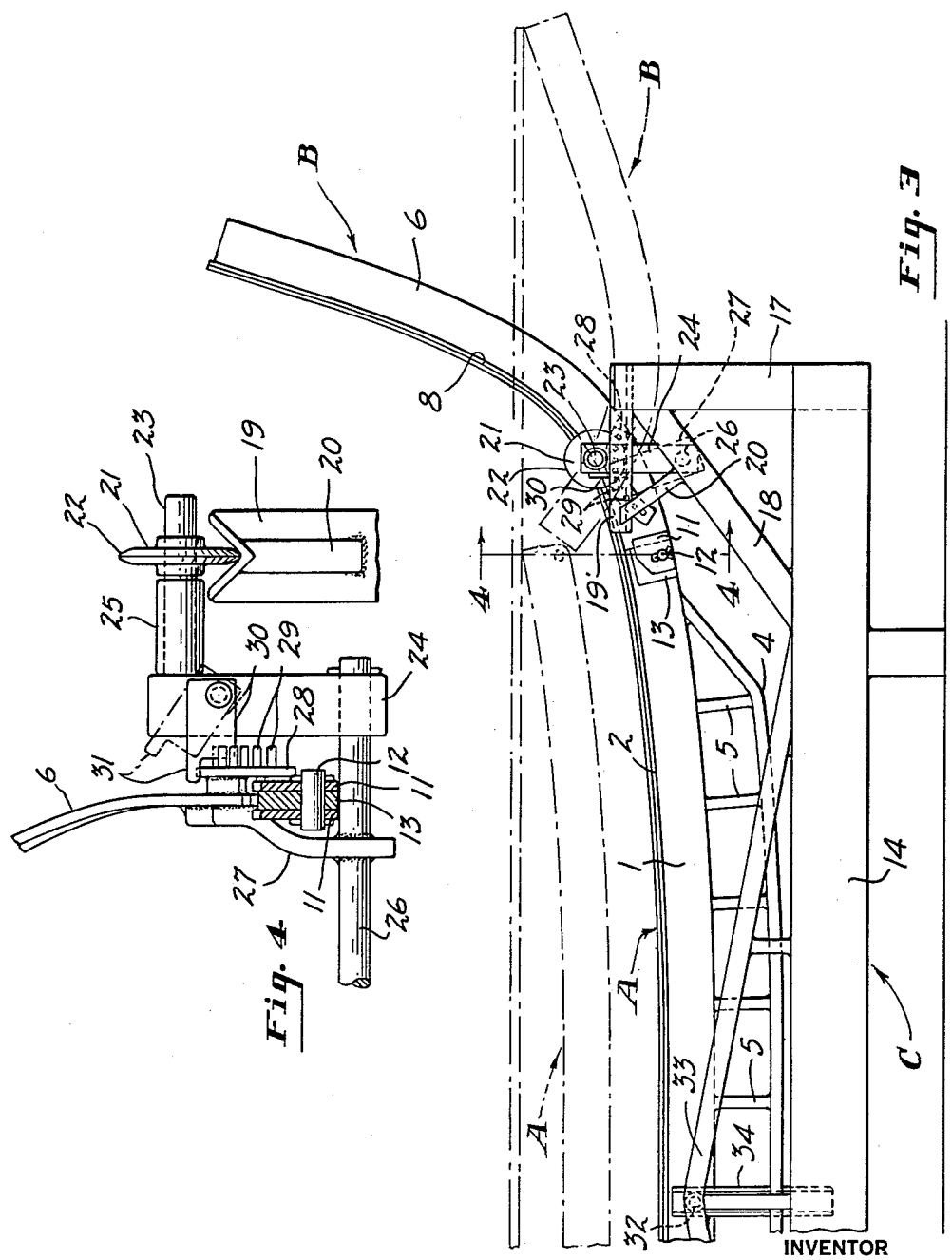

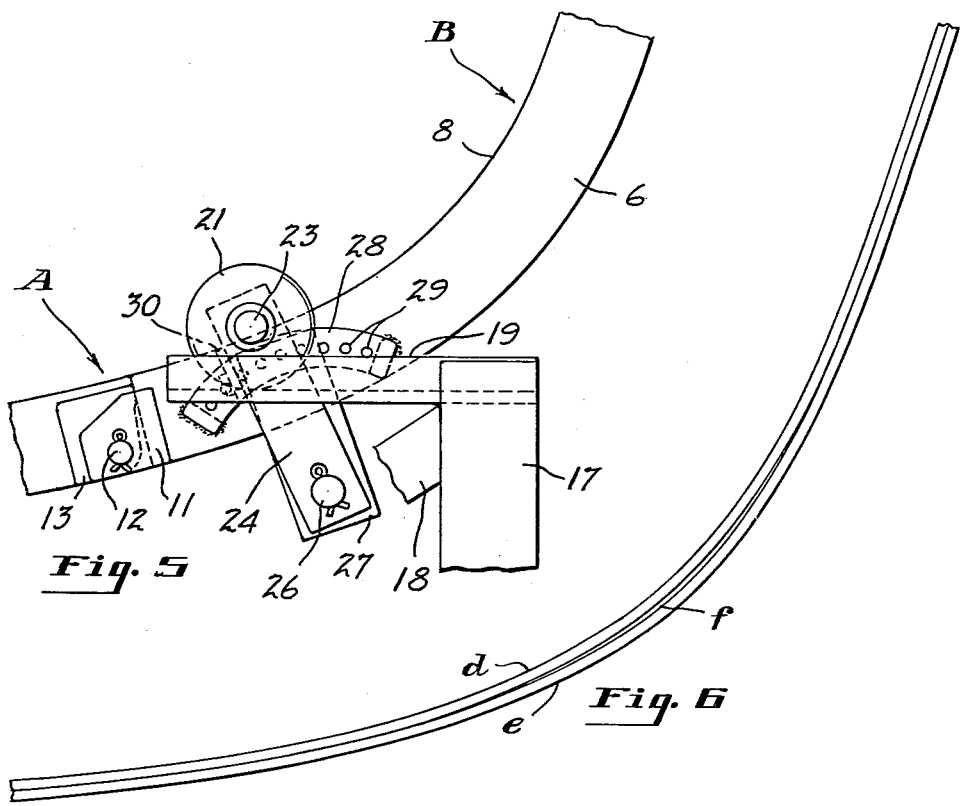

INVENTOR
Joseph E. Jendrisak
BY McCoy, Greene & te Grotenhuis
ATTORNEYS

United States Patent Office 3,189,426
Patented June 15, 1965

3,189,426
GLASS BENDING APPARATUS
Joseph E. Jendrisak, Northville, Mich., assignor to Shatterproof Glass Corporation, Detroit, Mich., a corporation of Delaware
Filed Mar. 29, 1960, Ser. No. 18,233
8 Claims. (Cl. 65—299)

This invention relates to the bending of sheet glass and more particularly to apparatus for shaping or molding glass panes that have been softened by application of heat.

In the manufacture of curved windshields and rear windows for automobiles the deeply bent glass sheets are shaped by so supporting them above concave molds that have narrow perimetric upwardly facing glass engaging faces that the heat softened glass sheets sag into contact with and conform to the glass engaging faces. Because of the fact that distortion of the glass or marring of the surface of the heated glass at points of engagement with a molding surface cannot be avoided, it is necessary to provide a mold that engages the glass sheets only adjacent the margins thereof in order to avoid undesirable optical defects. If the glass sheets are cut to final shape before bending it is necessary to provide a mold that is so constructed that its engagement with the glass is within a distance from the marginal edge thereof such that any surface irregularities will be concealed when the glass is installed in an automobile.

In the manufacture of safety glass windshields a sheet of thin transparent plastic is sandwiched between and adhered to two superposed sheets of glass and, in order to obtain the exact conformity between the two curved glass sheets that is necessary to avoid defects in the finished product, the two sheets that are to be laminated are matched by placing them one upon the other and simultaneously shaping them in a glass bending mold.

Molds for forming deeply bent windshield or back window glass for automobiles are commonly made up of sections articulated end to end and having end sections that are joined to the center section of the mold adjacent portions of the mold where the curvature is the greatest. The end sections swing vertically and upwardly from a glass receiving position where rigid sheets of glass may be supported by the mold in substantially horizontal position, to a molding position where the upwardly facing concave shaping surface of the mold has the shape to which the glass is to be bent.

The molds, with the glass to be bent supported thereon, are passed through a lehr in which the temperature is controlled to provide zones of gradually increasing temperature varying from about 600° F. to approximately 1300° F. and the molds are so supported on racks or cradles that the weight of the sections tends to hold the mold in closed position and the rigid column effect of the flat glass panes supported on the mold sections holds the mold in open position until the glass is softened by heat.

Heretofore molds have been so designed that they exert pressure against the glass which tends to accelerate the bending. The application of force to the glass panes has been effected by causing the end sections either to press against the end edges of the sheets or to exert an upward pressure on the bottom faces thereof adjacent the ends. This is achieved by various methods of mounting the mold on its supporting cradle. The center section may be mounted in a fixed position on the cradle and the end sections may be counter-weighted to swing them upwardly and inwardly about their pivotal connections to the center section and normally hold them in molding position. End sections so mounted may exert an end thrust or an upward thrust on the glass sheets supported at their ends on the outer ends of the end sections of the mold and this pressure acting upon the glass after it is softened by heat accelerates the bending of the heat softened glass.

In another form of mold commonly used, the end sections are fulcrumed on the cradle to rock about transverse axes intermediate their ends and are so connected to the center section that the weight of the center section is imposed upon the inner ends of the end sections and the end sections are overbalanced by the center section so that the weight of the center section exerts a substantial upward thrust on the end sections and on the ends of the glass panes during the bending operation which tends to accelerate the movement of the mold to its closed position.

In all of the molds heretofore commonly used in the producion of deeply bent windshield glass, a substantial force independent of the weight imposed on the mold by the glass, tends to move the mold from its glass supporting position to its closed molding position and there is a tendency to increase the speed of movement of the mold parts during the final portion of the closing movement that is caused by acceleration due to gravity, which results in a more sudden completion of the bend than is desirable.

In molds having sharply bent ends, the end sections swing through a relatively large angle from the flat glass supporting position to the mold closing position and the change in angular position during the closing of the mold causes an increase in the closing force exerted upon the end sections as the bending progresses. This increase in the closing force accelerates movement of the mold sections as the mold approaches its closed molding position. A high rate of bending toward the end of the closing movement of the mold is apt to cause unequal bending and imperfect matching of the two sheets of glass being bent.

Most of the defects in the bent glass which become apparent during the subsequent laminating operation or which appear after the glass has been installed in an automobile, are in the regions of the sharp bends that are formed near the juncture of the center and end sections of the mold and are attributable to the forces exerted on the glass during the bending operation. One troublesome defect is due to the failure of the top pane of glass to conform perfectly to the top surface of the bottom pane in the portions of greatest curvature. This lack of conformity is believed to be due to the bending of the lower glass sheet at a faster rate than the top sheet while the superposed sheets are sagging into the mold. This causes a relative longitudinal sliding movement between the contacting ends of the two sheets of glass as portions of the bottom sheet intermediate its ends move downwardly out of contact with the top sheet. The high frictional resistance to sliding movements of the top sheet on the lower sheet at the high temperature to which the glass is subjected during the bending operation may prevent the top sheet from completely conforming to the bottom sheet at the sharply bent end portions of the mold after the sagging movement of the bottom sheet has been stopped by engagement with the shaping face of the mold. Such a lack of conformity, even though too slight to be detected by visual inspection, may cause cracking of the glass or air bubbles between the glass sheets or a defect known as an "oil blow" which results from the trapping of oil between the glass panes during the laminating process. If the irregularity is so slight that the glass survives the laminating process, it may nevertheless result in a strain break after the windshield has been installed in an automobile.

Another defect attributable to too rapid a closing of the molds is the creation of a slight reversal of transverse curvature at the side edges of the glass in the portions of greatest longitudinal curvature. Such irregularity, even though very slight, is undesirable because even an extremely slight lateral displacement of the two panes of glass during the laminating operation will result in portions adjacent the edges that are out of contact where liquid may enter and which may cause breakage.

It is, therefore, desirable that the forces exerted by the mold upon the glass sheets during the bending operation be accurately controlled in order to eliminate the defects above referred to.

The problem of controlling the forces exerted by the mold upon the glass sheets during bending has been complicated by the fact that the hinged mold supports commonly employed offer considerable frictional resistance to movement of the mold parts and by the fact that it is impossible to accurately predetermine the effect of the heat to which the mold is subjected in the lehr upon such frictional resistance. It is therefore desirable that the mold supports be so designed that the frictional resistance to movement is very slight and so that the effect of heat upon the frictional resistance to movement is minimized.

The rate of bending of heated glass is affected by the thickness of the glass sheets and by the physical characteristics of the glass sheet. The variations in thickness and composition of the glass may to some extent be compensated for by control of temperature in the bending lehr, but such control is feasible only when a large number of identical glass panes are being simultaneously processed and is relatively ineffective because of the variations in thickness and variations in chemical composition of glass used for wndshields of identical size and shape.

Glass plate of ⅛" thickness is commonly employed for windshields and this glass varies in thickness from .109" to .135", the variation in thickness of panes to be paired for bending being from .218" to .230". The thickness of the glass being bent affects the amount of heat which must be absorbed by the glass during the bending operation and the chemical composition of the glass may affect the rate of heat absorption. For example, tinted glass has a higher rate of heat absorption than untinted glass. Segregation of glass according to thickness or according to heat absorbing characteristics is costly and is at best only a partial solution of the problem.

The present invention provides a mold of the collapsible type in which the end sections are fulcrumed on the cradle and the central portion of the mold is connected to the end sections in counterbalancing relation. The mold is so mounted that there is a minimum frictional resistance to movement of the mold sections as they are impelled toward closed position by the weight of the sagging glass. The center section of the mold is supported upon the inner ends of the end sections which are mounted on the cradle for swinging movements about a transverse substantially horizontal axis intermediate its ends and for longitudinal movements while the center section is moved vertically and held against longitudinal movements.

In order to reduce frictional resistance to movements of the mold sections during the bending operation, the end sections are supported upon members that are mounted for free travel in a horizontal path on the supporting cradle and are connected to the freely movable members to swing about transverse axes. The supporting members are preferably in the form of wheels that roll freely on horizontal ways or tracks on the cradle.

In order to provide a more uniform balancing of the weights of the center and end sections throughout their movements from the glass receiving position to the molding position, the supporting members are so mounted on the end sections that the axes about which the end sections rock are at a level approximately that of the adjacent portions of the shaping face of the mold. The rocking of the end sections about the pivotal axis causes a portion of the end section to swing outwardly past the vertical plane of said axis during the closing movement of the mold to compensate for the shifting of the center of gravity of the end section inwardly toward the axis, so that the counterbalancing effect of the end section is maintained during final portion of the mold closing movement.

In order to regulate the forces exerted by the mold upon the glass during bending operation, the mold of the present invention is provided with means for adjusting the fulcrum axis of the end sections toward or away from the hinge connections between the end and center sections. In general, it has been found desirable to so adjust the supporting wheels that the weight of the center section substantially balances the weight of the end sections. For glass panes having a thickness near the lower tolerance limit and for glass having a high rate of heat absorption, the supporting wheels may be adjusted to positions closer to the hinge connections between the sections so as to insure slow movement of the mold sections adjacent the closed or molding position. For panes of glass of a thickness approaching the upper tolerance limit and for glass having a relatively low rate of heat absorption, the wheels may be adjusted at a greater distance from the hinge connections to increase the force exerted on the glass by the mold during the bending operation.

Adjustment of the pivotal axis about which the end sections fulcrum makes it possible to increase or decrease the force that is applied to the heated glass by the mold sections during the bending operation, so that the mold will be closed slowly and mainly by the force exerted thereon by the sagging glass.

Since the mold is supported on members which have free horizontal movement on the supporting cradle, shifting of the mold on the cradle is prevented by holding the center section against endwise movements with respect to the cradle. Such movement of the center section is preferably provided by means of suitable guide members such as a vertical guide channel and pin fixed, one to the mold section and the other to the cradle. The pin guided in the channel prevents endwise movement of the center section while permitting it to have free vertical movement. The mold supports are preferably designed to permit the mold to be lifted bodily off the cradle or to be lowered into place on the cradle.

The provision of pickoff molds is highly convenient for purposes of repair and storage and also reduces the number of supporting cradles required. A single cradle may provide support for a considerable number of different molds, so that the number of cradles required is only that required for the glass that can be simultaneously processed in the bending lehrs. Storage of molds is facilitated since the molds, when not in use, can be hung on wall pegs or overhead supports, thereby greatly reducing the amount of factory space required for storage of the large number of molds required for the production of the numerous sizes and shapes of glass employed in the various makes and models of motor vehicles that are currently in service.

The present invention is applicable to the bending of half windshields of the wraparound type such as are used in bus or truck bodies. For such half windshields the mold is composed of two sections hinged together near the portion of greatest curvature and supported in counterbalancing relation. The section that conforms to the more nearly straight portion is rockably supported on the cradle but held against endwise movement and the mold is supported adjacent the hinge connection between the sections by means of rollers that travel on substantially horizontal tracks or ways during movement from the glass receiving position to the molding position and that are adjustable to vary the counterbalancing effect. It is to be understood that the tracks or ways may be inclined slightly to the horizontal or may have curved contours in order to obtain the desired balance of the mold parts during the bending operation.

Reference should be had to the accompanying drawings forming a part of this specification in which:

FIGURE 1 is a top plan view of glass bending apparatus in the form of a collapsible mold and supporting cradle which embodies the invention;

FIG. 2 is a side elevation of the mold and cradle in which the mold is shown in full lines in its glass receiving position and in dotted lines in its closed or molding position;

FIG. 3 is a fragmentary side elevation of one end of the mold and cradle on a somewhat larger scale, the mold being shown in closed position in full lines and in glass receiving position in dotted lines;

FIG. 4 is a fragmentary vertical section taken on the line indicated at 4—4 in FIG. 3;

FIG. 5 is a fragmentary side elevation showing one of the end sections with its horizontally movable support;

FIGS. 6, 7 and 8 are diagrammatic views showing flaws in mating curved glass sheets that have heretofore been frequent and that have greatly added to the expense of producing automobile windshields;

FIG. 7 shows a slight reverse curvature at the edges which is frequently incident to the bending of pairs of glass sheets in a collapsible mold;

FIG. 8 shows the gaps that appear between the superposed sheets bent as shown in FIG. 7 when there is a slight lateral displacement of the two sheets;

Figure 9:
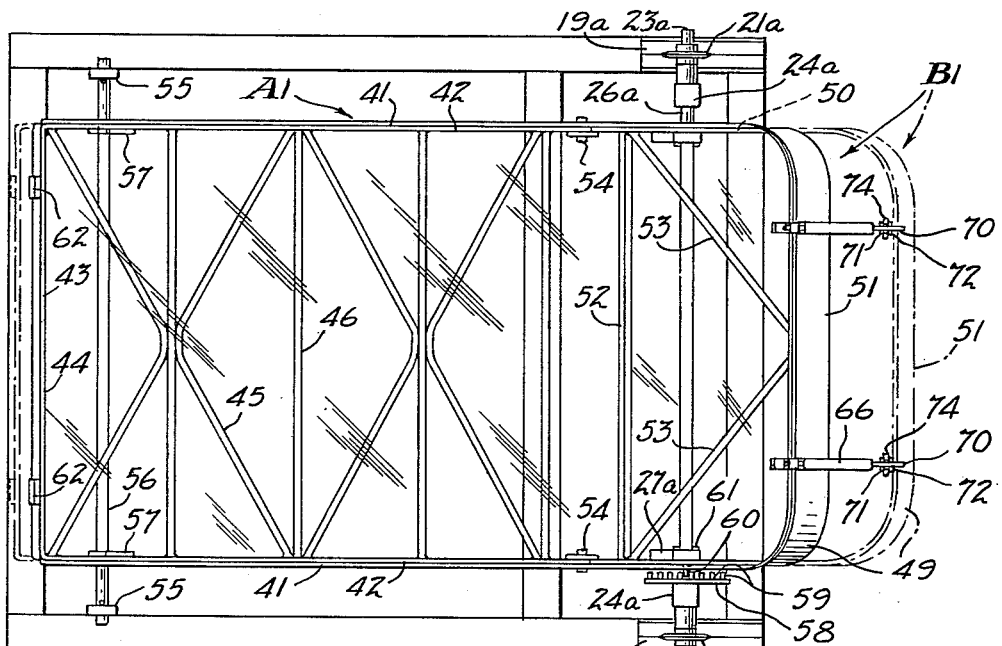
FIG. 9 is a top plan view of a two section mold that embodies the invention and that is designed for bending a half windshield.

Referring to the accompanying drawings, FIGS. 6, 7 and 8 show defects which have heretofore been frequent in glass sheets which have been paired and simultaneously bent in a mold of the collapsible type and which are substantially eliminated by the present invention.

In FIG. 6 two superposed bent sheets of glass *d* and *e* are shown which have a slight space or gap *f* between them in the portion of sharpest curvature. Such a defect makes it impossible to produce a satisfactory laminated windshield from the two sheets of glass for the reason that pressure applied to the glass during the laminating operation may result in breaking the glass and if the gap is so slight that it does not cause breakage during the laminating operation, it may cause leakage of oil or air into the space between the glass sheets or may cause strain breaks after the glass is installed in an automobile.

FIGS. 7 and 8 show another type of defect which has heretofore been common in pairs of sheets that have been mated by simultaneous bending. This defect is in the form of a slight reverse curvature *g* at each edge of the glass sheets near the region of greatest longitudinal curvature. FIG. 8 shows how this reverse curvature at the edges creates a gap *h* between the two sheets adjacent the edges if there should be a slight lateral misalignment of the sheets during the laminating operation. These gaps also are apt to result in breakage or oil blows.

The mold of the present invention is designed to so control the movement of the mold during the bending operation that separation of the sharply bent portions of the two sheets and the reverse bending of the edges will be avoided.

The mold of the present invention is of the collapsible type having a center section A and end sections B that are pivotally connected end to end and that are mounted for collapsing movement in a suitable cradle C which provides a support for the mold during its travel through the bending lehr. The center section A has two glass engaging side rails 1 in the form of thin flat steel straps provided with longitudinally concave top edges 2. The side rails 1 are connected by diagonal cross braces 3 and each side rail has a truss-like bracing structure of the character described and claimed in my Patent No. 2,872,756 granted Feb. 10, 1959. The bracing structure comprises a tension chord 4 welded at its ends to the opposite end portions of the rails 1 and spaced posts 5 connecting the rail 1 and chord 4 intermediate the ends and welded to the chord 4 and rail 1. The two end sections of the mold are usually identical in size and shape and each has a marginal rail 6 in the form of a metal strap of the same cross sectional dimensions as the side rails 1 of the center section, the end sections being reinforced by suitable diagonal braces 7. The rails 6 of the end sections have concave top glass engaging edges 8 which conform to the end portions of the curved sheets that are formed in the mold. The side rails 1 of the center sections and the marginal rails 6 of the end sections have end faces 9 and 10 that abut when the mold is in its closed molding position and the inner ends of the top edges 8 of the rails 6 are flush with the end portions of the top edge 2 of the center section side rails, forming therewith a continuous parametric concave glass shaping surface when the mold is closed.

The rails 6 of the end sections have hinge plates 11 attached to their ends which straddle the adjoining ends of the rails 1 and which are connected to the rails 1 by transverse pivot pins 12. The plates 11 may be formed of a heat resistant steel and the rails 1 may be provided with heat resistant inserts 13 so as to provide a pivotal connection which will not frictionally bind when subjected to the heat of the glass bending lehr.

The cradle C has a rectangular base formed by longitudinal side bars 14 and end bars 15 and is provided with transverse runners 16 which are attached to the under sides of the side bars 14 intermediate the ends thereof and which support the cradle on the live rollers or other conveying means of the glass bending lehr. The cradle has four vertical posts 17 of equal height attached to the side rails 14 at the four corners of the base, each post being provided with a brace 18 extending from near the top thereof that extends downwardly therefrom at an inclination to the longitudinal rail 14 to which the post is attached. Attached to the top of each post is a horizontal V-shaped track or way 19 that extends inwardly from the post and that is mounted in fixed position on the cradle, being supported adjacent its inner end by a short strut 20 extending upwardly from the brace 18. Each horizontal track 19 receives a mold supporting wheel 21 that is provided with a chamfered periphery 22 that conforms to the narrow rounded bottom of the V-shaped track or way 19. Each wheel 21 is rotatable on a short horizontal shaft 23 fixed to an arm 24 positioned outwardly of the marginal glass engaging portion of the mold, a spacer sleeve 25 being provided on each of the shafts 23 to restrict lateral movements of the mold with respect to the wheels 21. Each of the arms 24 receives a transverse shaft 26 that is fixed in brackets 27 fixed to the rail 6 of an end section at opposite sides of the end section. The brackets 27 extend downwardly from the rails 6 and the arms 24 extend upwardly from the shafts 26. The arms 24 are secured in fixed position with respect to the end sections B which are supported by the wheels 21 for free horizontal movements on the cradle and for rocking movements about the axis of the shafts 23. The arms 24 extend upwardly from the shafts 26 so that the axes of the shafts 23 are positioned near the top edges of the rails 6 which form portions of the glass shaping surface. By so positioning the shafts 23, a more uniform counterbalancing action throughout the movement of the sections from the glass receiving to the molding position is obtained for the reason that portions of the end sections below the pivotal axis about which the sections swing, move outwardly and increase the weight acting to counterbalance the center section as the centers of gravity of the end sections are shifted inwardly toward the pivotal axis because of the upward swing of the outer portions of the end sections during the closing movement of the mold.

It has been found desirable to provide means for adjusting the pivot about which the end sections rock toward and away from the pivotal connection between the end sections and the center section so as to vary the counterbalancing action to compensate for differences in the rate of heat absorption of the particular glass being processed. In order to provide this adjustment an arcuate plate 28 is attached to the marginal rails 6 of the end sections above the transverse shaft 26 and these segments carry outwardly projecting pins 29 that are regularly spaced and that are disposed in an arc having its center adjacent the axis of the transverse shaft 26.

Each arm 24 has a detent 30 in the form of a flat plate pivoted to a side face thereof which enters the spaces between pins 29 to hold the arm in various positions of angular adjustment. Each detent 30 is provided with a projecting finger 31 that engages with the top edge of the plate 28 to limit its downward swinging movement and retain it in locking position.

A horizontal guide pin 32 is fixed to members 33 attached to and projecting upwardly from one of the side rails 14 and this pin engages in a vertical channel 34 attached to the adjacent side rail 1 of the center section A. The channel 34 and pin 32 serve to hold the center section A against endwise movements so that the supporting wheels 21 move inwardly and outwardly during the opening and closing movement of the mold. Since the tracks 19 are substantially horizontal and the wheels 21 of fairly large diameter, the end sections have free longitudinal movement inwardly and outwardly during the movements of the mold sections and there is no frictional resistance to movement of the sections other than the slight friction on the pivots 12, wheels 21 and shafts 23.

It has been found desirable to so adjust the supporting shafts 23 with respect to the pivots 12 that the center section is substantially balanced by the weight of the end sections. This balancing of the mold sections limits the force exerted on the mold during closing to that imposed by the sagging of the glass sheets when heated and will result in a relatively slow downward movement of the center section so that the movement of the glass is approximately that which the glass sheets would have if sagging freely as they are softened by heat. For glass which absorbs heat at a rate faster than the average such as thin sheets or tinted sheets, the arms 24 will be adjusted toward the pivots 12 to increase the counterbalancing effect of the end sections and for thicker sheets and sheets which absorb heat at a lower rate, the shafts 23 will be adjusted outwardly away from the pivots 12 to decrease the counterbalancing effect of the end sections. The forces exerted on the glass sheets by the mold may thus be regulated to provide the force desirable for glass of different weights and compositions.

Since the mold is retained on the cradle solely by means of the tracks 19, the wheels 21, the pin 32 and the open guide channel 34, it may be mounted on the cradle by merely lowering it into position thereon and may be lifted bodily off the cradle. Any one of a large number of different molds can be carried by a cradle and one mold may be quickly replaced by another with a minimum of labor, so that the number of cradles required is greatly reduced and the repair and storage of molds facilitated.

Figure 10:
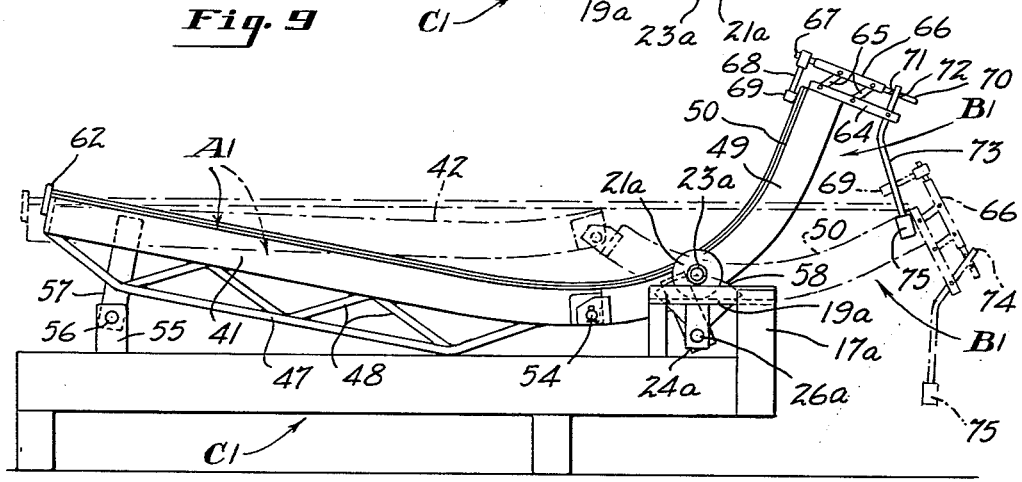
FIG. 10 is a side elevation of the mold shown in FIG. 9.

While most panoramic or wrap around automobile windshields and back windows are made in one piece, corresponding windows of larger motor vehicles such as busses and trucks are often made in two parts to extend laterally from opposite sides of a center post or dividing strip. Although these half windows have a single sharp bend instead of two, the present invention can be advantageously employed in bending them. As shown in FIGS. 9 and 10, such half windows may be formed in a mold composed of two sections A1 and B1 that are hinged together to move from an open glass receiving position to a closed molding position where the glass shaping surface conforms to the contour of the finished window glass. The section A1 corresponds to one half of the center section A of the full windshield mold previously described and the section B1 to one of the end sections B of the full windshield mold, the sections A1 and B1 being hinged together adjacent the portion of the mold that has the greatest curvature.

The section A1 is formed with side rails 41 in the form of flat steel bars that provide narrow top edges 42 for engagement with the glass. The edges 42 are nearly straight but usually are slightly concave longitudinally. At one end the rails 41 are connected to an end rail 43 at substantially right angles thereto and having a top edge 44 that is flush with the top edges of the rails 41. The rails 41 are connected by diagonal and perpendicular cross braces 45 and 46 that are welded or otherwise suitably secured to the rails 41 near their bottom edges. The side rails 41 are preferably provided with truss-like reinforcing means in the form of tension chords 47 attached to the lower edges of the rails 41 adjacent their ends and connected to the rails 41 intermediate their ends by short connecting braces 48.

The section B1 has a marginal rail 49 of the same cross sectional dimensions as the rails 41, the ends of which abut the free ends of the rails 41 when the mold is closed, the rail 49 having a top glass engaging edge 50 which, with the top edges 42 and 44 of the rails 41 and 43, forms the marginal glass shaping surface of the mold. As herein shown, the rail 49 has a central portion 51 at substantially right angles to its end portions to conform to a wide end windshield. A cross brace 52 is attached to the rail 49 adjacent its ends and extends across the space between said ends and a V-shaped brace 53 is attached at its apex to the portion 51 of the rail 49 centrally thereof and at its ends to the rail 49 adjacent the cross brace 52. The ends of the rail 49 are connected to the rails 41 by pivots 54 which may be identical with the pivots 12 of the full windshield mold previously described.

As in the full windshield mold, the flat glass sheets to be bent are supported in substantially horizontal position on the ends of the marginal glass shaping surface of the mold and upon intermediate portions of the glass shaping surface adjacent the pivots 54 and the sections collapse with the sagging glass supported thereon to the closed or molding position. The pivots 54 are offset with respect to the end faces of the rails 41 and 49 that abut when the mold is closed so that the end of the glass engaging edge of one rail adjacent each pivot 54 remains above the other during the movement of the mold from its open glass receiving position to its closed position. The mold sections are so mounted on the supporting cradle that the pivotally connected ends of the sections have substantially vertical movement to and from closed position. In order to provide such movement the two mold sections are preferably both mounted for rocking movement on the supporting cradle. The section A1 is supported on bearing brackets 55 carried by the cradle positioned beneath the end thereof remote from the pivotal connection between the sections by means of axially alined horizontal pivots 56 connecting the brackets 55 to arms 57 fixed to the rails 41 and extending downwardly therefrom.

The section B1 is supported for vertical rocking and longitudinal movements on the cradle in the same manner as the end sections of the full windshield mold. The cradle C1 has standards 17a that support horizontal V-shaped tracks or ways 19a on opposite sides of the section B1 and the section B1 is supported for longitudinal movement with coaxial rollers 21a that travel on the tracks 19a and for swinging movement about the axis of the rollers 21a. The rollers 21a are rotatable on coaxial shafts 23a fixed to arms 24a fixed to and extending upwardly from a transverse shaft 26a journaled in brackets 27a attached to the rail 49 adjacent its pivotal connections to the rails 41.

Figure 11:
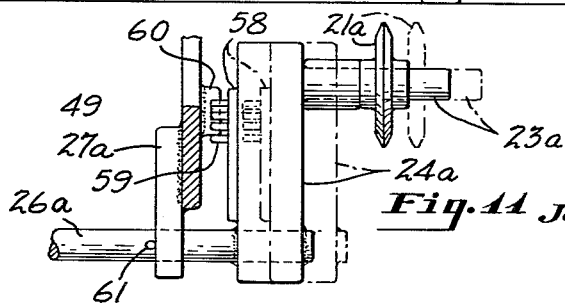
FIG. 11 is a fragmentary elevation viewed as indicated at 11—11 in FIG. 10 showing the roller adjusting means.

The position of the supporting wheels with respect to the pivots 54 is adjusted by securing the arm 24a to the rail 49 in various positions of angular adjustment about the axis of the shaft 26a. One simple and convenient means for securing the wheel carrying arm in different positions of adjustment is that illustrated in FIGS. 3 and 4 of the drawing. An alternative adjusting means is shown in FIGS. 10 and 11 in which an arcuate segment 58 concentric with the shaft 26a is attached to the inner face of the arm 24a and is provided with an arcuate row of inwardly projecting teeth 59 that are spaced apart to receive an upright locking rib 60 fixed to the outer face of the rail 49. The rib 60 may be in the form of a short metal plate projecting at right angles to the rail 49 and welded thereto.

To permit angular adjustment of the arm 24a with its segment 58, the shaft 26a is slidable in the brackets 27a to move the arm 24a outwardly away from the rail 49 and disengage the teeth 59 from the locking rib 60 so that the arm 24a and segment 58 may be angularly adjusted and again locked by moving the shaft 26a and arm 24 inwardly toward the rail 49 to position the rib 60 in the space between aonther pair of teetth 59. The shaft 26a is locked in operative position by means of a removable pin 61 that extends through the shaft just inside the bracket 27a that is adjacent the arm 24a, and holds the segment 58 in engagement with the rib 60. When the pin 61 is removed the shaft 26a is free to slide outwardly to release the segment 58 from the rib 60. The locking of the wheel carrying crank arm in adjusted position by means of the interengaging segment 58 and rib 60 is advantageous in that accidental release of the arm such as might occur with a movable detent is prevented.

Single glass sheets or a pair of superposed pre-cut glass sheets may be placed on the mold with opposite ends resting upon the cross rail 43 at the end of the section A1 and the portion 51 of the marginal rail 49 of the section B causing the outer end of the section B1 formed by the portion 51 of the glass engaging rail to be moved downwardly and the pivotally connected ends of the two sections to be moved upwardly until the ends of the rails 41 adjacent the pivots 54 engage the under side of the glass, the pivotal connections being so disposed that the glass engaging portions of the mold are substantially in a horizontal plane when supporting the rigid glass sheets. As the glass is softened by heat it sags and imposes more weight on the portion of the mold adjacent the pivots 54, causing the pivoted ends of the mold sections to move downwardly to the molding position while the section B1 swings upwardly.

For convenience in initially positioning the glass, the rail 43 may be provided with laterally spaced lugs 62 which are attached to the outer face of the rail and project above the top face 44 thereof.

Molds for full windshields of the wide end type are supported in the same manner as the mold shown in FIGS. 1 to 5 of the drawings and differing from the full windshield mold only in the size and shape of the mold sections.

When an end of the mold is very steeply inclined in the closed position there may be a tendency for the ends of the glass sheets to move inwardly out of contact with the end of the mold shaping surface when the mold reaches its closed position and means has been provided for engaging the top face of the window glass being bent as the mold approaches its closed position to hold the glass in contact with the end of the mold shaping surface. In FIGS. 9 and 10 two identical hold down devices are shown attached to the portion 51 of the rail 49 for engaging the glass at laterally spaced points. Each hold down has a channel bar 64 attached to the outer side of the portion 51 of the rail 41 and disposed at right angles to the top edge of the rail and terminating short of said top edge. Parallel links 65 are pivoted in the channel 64 and in a parallel channel 66. The channel 66 has a forward extension 67 which carries a laterally swinging depending arm 68 which carries a loosely mounted glass engaging shoe 69. The channel 66 has a rearward extension 70 which has spaced transverse pins 71 and 72. A lever 73 is pivoted intermediate its ends to the rear end of the bar 64 and is provided with a forked upper end 74 which straddles the extension 70 between the pins 71 and 72. The lever 70 has a counterweight 75 at its lower end. The counterweight 75 is so disposed that when the mold is in open glass receiving position the bar 66 is projected forwardly and the arm 68 and shoe 69 are held at a considerable distance above the marginal glass engaging surface of the mold. To facilitate the placing of the glass on the mold, the arm 68 may be swung laterally on the extension 67 to a position clear of the end portion of the mold upon which the glass is to be placed. As the mold approaches closed position the bars 64 and 66 move from a nearly vertical position to a position approaching the horizontal and the counterweight 75 moves past the vertical plane of its pivot and reverses the thrust on the bar 66 and moves the same outwardly causing the shoe 69 to press lightly against the glass and hold it against the end of the mold.

Molds of the half windshield type such as shown in FIGS. 9 to 11 are readily removable and interchangeable, it being only necessary to remove the pivots 56 in order to detach the mold from its cradle.

By providing better control of the closing movements of the mold to provide proper bending action for glass sheets of different thicknesses and for various types of glass, losses due to lack of conformity of curved sheets paired for lamination are practically eliminated.

It has been found that molds embodying the present invention have considerably longer life than molds heretofore used and that the cost of maintenance of these molds is considerably less. This is believed to be due to the fact that stresses tending to deform the mold parts are greatly reduced because of the more perfect balancing of the mold parts during the bending operation.

A certain amount of compensation for differences in the thickness and differences in glass compositions may be provided by varying the speed of travel of the molds through the various heating zones in the bending lehr and by varying the elevation at which the molds are supported during their travel through the lehr. However, such adjustments do not entirely compensate for differences in heat absorbing characteristics of sheets of glass that may be treated in the lehr and it has been found that proper positioning of the pivotal supports which provide the fulcrum about which the mold parts are balanced makes it possible to more accurately compensate for different thicknesses of glass and for differences in compositions of the glass being treated.

It is not necessary to provide all of the molds with adjustable fulcrums or pivots, since such adjustable pivot molds may be used to determine the proper position of the fulcrum of a given mold for a particular type of glass. If a large number of sheets of glass are being continually processed with a glass of a certain composition and which does not vary too greatly in thickness, it is feasible to determine by bending such sheets on a mold with adjustable pivots, the proper position of the fulcrum, after which molds for that particular glass may be built with the fulcrum pivot properly spaced from the pivot connecting the sections. However, the adjustable pivot is desirable, not only for determining the proper setting of the pivot, but for the bending of glass where glass of different thickness and glass of different composition is employed for windshields of the same size and shape.

An important feature of the present invention is that it greatly reduces the tendency of the glass sheets to shift longitudinally of the mold during the bending operation. Such shifting will cause one end of the glass sheets to project laterally from the central portion of the curved pane further than the other end and, if this inequality is too great, it will result in the rejection of the curved pane. However, if the difference is slight, one end of the sheet may be ground away enough to enable the panes to be used. The present invention greatly reduces the tendency for the panes to shift longitudinally in the mold during bending, reduces the amount of expensive grinding required due to such shifting and practically eliminates rejects due to excessive shifting. In the bending of superposed precut sheets of glass the present invention not only reduces the slippage between the bottom sheet which engages with the mold with respect to the mold, but also reduces the slippage of the top sheet upon the bottom sheet because of the better control of forces acting upon the glass sheets during bending, so that more perfect registry between the ends of the mated glass sheets is obtained.

Another advantage of the present invention is the elimination of lifting or lowering of the mold bodily during the closing of the mold. The lifting or lowering of the mold bodily during the closing movement is undesirable because such lifting or lowering affects the amount of force exerted by the mold on the glass during the bending operation. By providing movement of the fulcrum substantially in a horizontal plane during the bending operation, it is possible to maintain a more perfect balance during the bending operation and any deviation from the horizontal should be slight and is desirable only for the bending of glass which varies considerably from the average properties of the glass for which the temperature controls and heat shielding elements of the lehr are set.

It is to be understood that in accordance with the provisions of the patent statutes, variations and modifications of the specific devices herein shown and described may be made without departing from the spirit of the invention.

What I claim is:

1. Glass bending apparatus comprising a supporting cradle, a collapsible mold having center and end sections pivotally connected end to end and movable from a glass receiving position to a molding position, said sections being constructed to provide a narrow perimetric upwardly facing glass shaping surface that is substantially continuous and concave when the sections are in closed molding position and being movable from said molding position to a glass receiving position in which end and intermediate portions of the shaping surface are in a substantially horizontal plane for supporting engagement with the under side of a glass sheet, a transverse shaft journaled in each end section intermediate the ends of the section, a pair of spaced crank arms on each of said shafts located one on each side of the end section in which the shaft is journaled, supporting wheels mounted on the crank arms of each pair for rotation about an axis parallel to the shaft axis, parallel ways on said cradle extending longitudinally of the mold upon which said wheels roll, means for adjusting each of said crank shafts angularly to simultaneously shift the wheels carried thereby toward or away from the inner end of the end section in which the shaft is journaled, and means for holding said center section against endwise movement.

2. Glass bending apparatus according to claim 1 in which the ways on said cradle are in the form of V-shaped grooves and in which the supporting wheels have chamfered peripheries for centering them in said grooves.

3. Glass bending apparatus according to claim 1 in which the supporting wheels are so mounted on the end sections that their axes are adjacent the level of the portions of the perimetric shaping surface adjacent thereto.

4. Glass bending apparatus comprising a supporting cradle, a collapsible mold having center and end sections pivotally connected end to end and movable from a glass receiving position to a molding position, said sections being constructed to provide a narrow perimetric upwardly facing glass shaping surface that is substantially continuous and concave when the sections are in closed molding position and being movable from said molding position to a glass receiving position in which end and intermediate portions of the shaping surface are in a substantially horizontal plane for supporting engagement with the under side of a glass sheet, a transverse shaft journaled in each end section intermediate the ends of the section, a pair of spaced crank arms on each of said shafts located one on each side of the end section in which the shaft is journaled, supporting wheels mounted on the crank arms of each pair for rotation about an axis parallel to the shaft axis, parallel longitudinally extending ways on said cradle upon which said wheels roll, means for securing the crank arm of each of said transverse shafts to the end section in which said transverse shaft is mounted in different positions of angular adjustment about the axis of said transverse shaft, and means for holding said center section against endwise movement.

5. Glass bending apparatus according to claim 4 in which the means for securing the crank arm in different positions of angular adjustment comprises a toothed segment with spaced teeth fixed to the arm, a segment engaging projection fixed to the mold section and releasable means for holding the shaft to which the crank arm is attached against endwise movement with said projection in the space between two adjacent teeth of said segment.

6. An apparatus for bending glass sheets comprising a supporting cradle having spaced parallel longitudinal ways mounted in fixed position thereon, a bending mold mounted on said cradle and composed of sections pivotally connected end to end and movable between an open glass-receiving position and a closed molding position, said sections being constructed to provide a narrow perimetric upwardly facing glass-shaping surface that is substantially continuous and concave when said mold is closed, said glass shaping surface having end and intermediate portions which are coplanar when said mold is open for supporting engagement with the under side of a flat glass sheet to be bent, rollers mounted on a section forming one end of said mold, said rollers adapted for free linear travel on said ways, said end section being rockably supported by said rollers for pivotal movement about a transverse axis intermediate the ends of said end section near the level of adjacent portions of said glass shaping surface, said axis being located to provide a substantially counterbalancing connection between said mold sections whereby said mold is in a substantially stable balanced condition throughout its movement between its open and closed positions, and means for restraining endwise movement of the inner end of said end section.

7. An apparatus as defined in claim 6 wherein said mold comprises a center section and two end sections having substantially identical counterbalancing connections to said center section.

8. An apparatus as defined in claim 6 wherein said mold comprises two sections pivotally connected end to end.

References Cited by the Examiner

UNITED STATES PATENTS

| | | | |
|---|---|---|---|
| 2,691,854 | 10/54 | Rugg | 65—26 |
| 2,736,140 | 2/56 | Black | 65—291 |
| 2,872,756 | 2/59 | Jendrisak | 65—290 |
| 2,940,222 | 6/60 | Davidson et al. | 65—104 |

DONALL H. SYLVESTER, *Primary Examiner.*

CHARLES R. HODGES, *Examiner.*